United States Patent [19]

Tanabe et al.

[11] Patent Number: 5,683,948
[45] Date of Patent: Nov. 4, 1997

[54] HERMETIC SEALING COMPOSITION

[75] Inventors: Ryuichi Tanabe, Yokohama; Satoshi Rokudai, Funabashi; Yuichi Kuroki, Funabashi; Akira Nakamura, Funabashi, all of Japan

[73] Assignees: Asahi Glass Company Ltd., Tokyo; Iwaki Glass Company Ltd., Funabashi, both of Japan

[21] Appl. No.: 681,961

[22] Filed: Jul. 30, 1996

[30] Foreign Application Priority Data

Aug. 22, 1995 [JP] Japan .................... 7-213693

[51] Int. Cl.$^6$ .................... C03C 8/14; C03C 14/00
[52] U.S. Cl. .................... 501/17; 501/15; 501/32; 501/10; 501/76
[58] Field of Search .................... 501/17, 15, 32, 501/10, 76

[56] References Cited

U.S. PATENT DOCUMENTS

| | | | |
|---|---|---|---|
| 3,967,973 | 7/1976 | Francel et al. | 501/15 |
| 3,973,975 | 8/1976 | Francel et al. | 501/15 |
| 4,038,091 | 7/1977 | Francel et al. | 501/15 |
| 4,098,611 | 7/1978 | Francel et al. | 501/15 |
| 4,099,977 | 7/1978 | Francel et al. | 501/15 |
| 4,115,132 | 9/1978 | Suzuki et al. | 501/15 |
| 4,120,678 | 10/1978 | Francel et al. | 501/15 |
| 4,246,034 | 1/1981 | Kellberg | 501/15 |
| 4,405,722 | 9/1983 | Kokubu et al. | 501/32 |
| 5,145,803 | 9/1992 | Daimer et al. | 501/15 |
| 5,284,706 | 2/1994 | O'Donnelly | 501/32 |
| 5,534,469 | 7/1996 | Hayashi | 501/15 |
| 5,578,533 | 11/1996 | Manabe et al. | 501/17 |
| 5,612,261 | 3/1997 | Lim et al. | 501/32 |

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

A hermetic sealing composition comprising 100 parts by weight of a basic composition consisting of from 80 to 99.9 wt % of a crystalline low melting glass powder containing lead and boron and from 0.1 to 20 wt % of a low expansion ceramic filler, and from 0.001 to 1.0 part by weight, in total, of at least one of an $\alpha$-4PbO·B$_2$O$_3$ crystal powder and a Pb$_3$O$_4$ powder, incorporated to the basic composition, the thermal expansion coefficient of the sealing composition after firing being from $80 \times 10^{-7}$ to $105 \times 10^{-7}$/°C. within a range of from room temperature to 300° C.

11 Claims, No Drawings

HERMETIC SEALING COMPOSITION

The present invention relates to a hermetic sealing composition which is excellent in the electrical insulating property without undergoing dielectric breakdown even at a high voltage.

Heretofore, for hermetically sealing a panel and a funnel of a color cathode ray tube, it has been common to employ a $PbO$—$B_2O_3$—$ZnO$—$SiO_2$ crystalline low melting glass solder of the type as disclosed in Japanese Examined Patent Publication No. 17821/1960, whereby such a solder is heated at a temperature of from 430° to 450° C. for from 30 to 40 minutes for hermetic sealing.

The hermetically sealed portion thus obtained, will then be fired in a reducing atmosphere, whereby PbO crystals will precipitate, and consequently, dielectric breakdown is likely to occur when a high voltage (of level of 50 kV) is applied across the inside and outside of the hermetically sealed portion, thus leading to failure in electrical insulation.

It is an object of the present invention to overcome such a drawback and to provide a hermetic sealing composition wherein substantially no PbO crystals will precipitate and which is free from dielectric breakdown even when a high voltage (of a level of 50 kV) is applied.

The present invention provides a hermetic sealing composition comprising 100 parts by weight of a basic composition consisting of from 80 to 99.9 wt % of a crystalline low melting glass powder containing lead and boron and from 0.1 to 20 wt % of a low expansion ceramic filler, and from 0.001 to 1.0 part by weight, in total, of at least one of an $\alpha$-$4PbO.B_2O_3$ crystal powder and a $Pb_3O_4$ powder, incorporated to the basic composition, the thermal expansion coefficient of the sealing composition after firing being from $80\times10^{-7}$ to $105\times10^{-7}$/°C. within a range of from room temperature to 300° C.

Now, the present invention will be described in detail with reference to the preferred embodiments.

Whether or not a certain glass falls within the crystalline glass for the purpose of the present invention, can be determined on the basis of whether or not an exothermic peak by crystallization is observed when it is tested by a differential scanning calorimeter (DSC) or by a differential thermal analysis (DTA). Namely, when heated at a rate of 10° C./min and maintained at the hermetic sealing temperature (from 410° to 450° C.) for two hours, the one which exhibits an exothermic peak, is regarded as the crystalline low melting glass powder for the purpose of the present invention.

The low expansion ceramic filler is meant for a ceramic filler which has a thermal expansion coefficient of not larger than $70\times10^{-7}$/°C. The low melting glass is meant for the one having a softening point of not higher than 500° C.

The composition of the present invention establishes hermetic sealing when heated within a temperature range of from 410° to 450° C. for from 15 to 60 minutes, and it does not undergo dielectric breakdown even when a high voltage (of a level of 50 kV) is applied across the inside and the outside of the hermetically sealed portion of the cathode ray tube.

In the present invention, the content of the crystalline low melting glass powder containing lead and boron is within a range of from 80 to 99.9 wt % in the basic composition. If the content exceeds 99.9 wt %, the low expansion ceramic filler is so little that the thermal expansion coefficient tends to be too large and will depart from the thermal expansion coefficient of the panel glass and the funnel glass, thus leading to breakage. On the other hand, if the content is less than 80 wt %, the glass component is so little that the fluidity tends to be poor, and the air tightness of the sealed portion tends to be poor.

The content of the $\alpha$-$4PbO.B_2O_3$ powder and/or the $Pb_3O_4$ powder is within a range of from 0.001 to 1.0 part by weight in total, per 100 parts by weight of the basic composition. If the content is less than 0.001 part by weight, no adequate effects tend to be obtained, and if it exceeds 1.0 part by weight, the sinterability tends to be poor. More preferred within the above range is from 0.001 to 0.09 part by weight, and most preferred is from 0.005 to 0.07 part by weight.

With a powder of conventional glass composition, when it is maintained at a firing temperature, primary crystals ($2PbO.ZnO.B_2O_3$) will form as the time passes, and then secondary crystals ($\alpha$-$4PbO.B_2O_3$) will precipitate. In a case where dielectric breakdown takes place at a high voltage (of a level of 50 kV), tertiary crystals (PbO) will precipitate during or prior to precipitation of the secondary crystals.

With PbO itself, the electrical resistance is not so low as to lead to current leakage or dielectric breakdown. However, it is likely to be reduced during the firing by the binder-removing atmosphere to $PbO_{1-x}$, whereby the electrical conductivity is believed to be brought about.

Incorporation of the $\alpha$-$4PbO.B_2O_3$ crystal powder or the $Pb_3O_4$ powder is effective to promote precipitation of the secondary crystals ($\alpha$-$4PbO.B_2O_3$) and thereby to prevent precipitation of the tertiary crystals (PbO) which cause dielectric breakdown which in turn causes current leakage. At the secondary crystals ($\alpha$-$4PbO.B_2O_3$) precipitate in a large amount, the PbO component decreases, whereby PbO crystals will not precipitate.

Seed crystals for the secondary crystals ($\alpha$-$4PbO.B_2O_3$) can be prepared as follows. A raw material formulated so that $PbO:B_2O_3=80$ mol:20 mol, is melted at 900° C. for one hour and formed into flakes, followed by heat treatment at 440° C. for one hour. Then, the treated product is pulverized in a ball mill for a predetermined period of time to obtain a powder.

In the present invention, hermetic sealing can be obtained by heating the sealing composition within a temperature range of from 410° to 450° C. for from 15 to 60 minutes. To obtain hermetic sealing having a thermal expansion coefficient which is substantially equal to that of the glass for a cathode ray tube, the crystalline low melting glass powder preferably has the following composition:

| | | |
|---|---|---|
| PbO: | 73–82 | wt % |
| $B_2O_3$: | 7–10 | wt % |
| ZnO: | 9–14 | wt % |
| $SiO_2$: | 1–3 | wt % |
| BaO: | 0.1–3 | wt % |

In such a composition, if the content of PbO is less than 73 wt %, the softening point tends to be too high, the fluidity tends to be poor, and the strength and air tightness of the sealed portion are likely to be impaired. If the content of PbO exceeds 82 wt %, the softening point tends to be too low, and the strength at a high temperature tends to be poor.

If the content of $B_2O_3$ is less than 7 wt %, the softening point tends to be too high, and the fluidity tends to be poor. If it exceeds 10 wt %, the chemical durability tends to be poor.

If the content of ZnO is less than 9 wt %, crystallizability tends to be poor, and if it exceeds 14 wt %, devitrification is likely to form in the molten glass.

If the content of $SiO_2$ is less than 1 wt %, devitrification is likely to form in the melt, and if it exceeds 3 wt %, the softening point tends to be too high, and the fluidity tends to be poor.

BaO is necessary to improve the adhesion of the frit to the panel and funnel. If it is less than 0.1 wt %, no adequate effects tend to be obtained. If it exceeds 3 wt %, the thermal expansion coefficient tends to be too large.

On the other hand, the low expansion ceramic filler is preferably at least one member selected from the group consisting of zircon, alumina, mullite, silica, lead titanate, cordierite, β-eucryptite, β-spodumene and β-quartz solid solution. These fillers are incorporated in a total amount of from 0.1 to 20 wt %.

If the content of the low expansion ceramic filler exceeds 20 wt %, the fluidity at the time hermetic sealing tends to be poor. On the other hand, if the content of the low expansion ceramic filler is less than 0.1 wt %, it tends to be difficult to match the thermal expansion coefficient to that of the panel glass and the funnel glass, and the strength tends to be poor. Among such ceramic fillers, zircon and lead titanate are particularly preferred, since they are excellent in the hermetic sealing strength.

Further, the thermal expansion coefficient of the hermetic sealing composition within a range of from room temperature to 300° C., is required to be within a range of from $80 \times 10^{-7}$ to $105 \times 10^{-7}$/°C. If the thermal expansion coefficient is outside this range, a large tensile stress will be exerted to the panel glass or the frit, whereby the pressure resistance strength tends to be poor.

Now, the present invention will be described in further with reference to Examples. However, it should be understood that the present invention is by no means restricted to such specific Examples.

EXAMPLES 1 TO 8

In accordance with a usual method, starting materials were prepared, mixed and melted at a temperature of from 1,000° to 1,200° C. Then, the melt was formed into flakes. The flakes were pulverized in a ball mill for a predetermined period of time to obtain a crystalline low melting glass powder having the composition (unit: wt %) as shown in Table 1. Then, this crystalline low melting glass powder, a low expansion ceramic filler, an α-4PbO.B$_2$O$_3$ powder and a Pb$_3$O$_4$ powder were mixed in the weight proportions as identified in Table 1 to obtain a hermetic sealing composition. Examples 1 to 6 represent the hermetic sealing compositions of the present invention, and Examples 7 and 8 represent Comparative Examples.

With respect to each hermetic sealing composition, the flow button diameter, the bonding residual strength, the thermal expansion coefficient, the dielectric breakdown, the tertiary crystal level, the strength against hydraulic pressure and the strength against heat, were measured, and the results are shown in Table 1.

Flow button diameter

The flow button diameter represents the fluidity of the composition at the time of hermetic sealing. 10 g of a sample powder of the hermetic sealing composition was press-formed into a cylindrical shape having a diameter of 12.7 mm and then subjected to heat treatment at 440° C. for 35 minutes, whereupon the diameter (unit: mm) of the fluidized sample was taken as the flow button diameter. Such a flow button diameter is desired to be at least 26.5 mm.

Bonding residual strain

The hermetic sealing composition and a vehicle (a solution having 1.2% of nitrocellulose dissolved in isoamyl acetate) were mixed in a weight ratio of 11.5:1 to obtain a paste. This paste was coated on a funnel glass specimen and heat-treated under the same condition as in the case of measuring the flow button diameter. Then, the residual strain formed between the funnel glass specimen and the hermetic sealing composition, was measured by means of a polarimeter (unit: mμ/cm, "+" shows that the hermetic composition has a compression strain, and "−" shows that the hermetic composition has a tensile strain). A desired range of the residual strain is from −100 mμ/cm to +500 mμ/cm.

Thermal expansion coefficient

The hermetic sealing composition was heat-treated under the same condition as in the case for measuring the flow button diameter, then polished to a predetermined size and subjected to the measurement by a thermal mechanical analyzer (TMA). The elongation was measured under a condition of a temperature raising rate of 10° C./min, and an average thermal expansion coefficient (unit: ×10$^{-7}$/°C.) within a range of from room temperature to 300° C. was calculated. Taking matching of the thermal expansion property to the cathode ray tube glass into consideration, this value is required to be within a range of from 80 to 105.

Then, this hermetic sealing composition was placed between a funnel and a panel of 25 inch size and maintained at the temperature (from 420° to 450° C.) as identified in Table 1, for 35 minutes to hermetically seal the funnel and the panel to obtain a bulb. With respect to this bulb, the strength against hydraulic pressure and the strength against heat were measured in accordance with the following methods.

Strength against hydraulic pressure

A pressure difference by water was exerted between the inside and the outside of the bulb, whereby the pressure difference at breakage was measured (unit: kg/cm$^2$, an average value of five samples). To ensure the strength as a bulb, this strength is usually desired to be at least 3 kg/cm$^2$.

Strength against heat

The measurement was carried out by applying a temperature difference by water and oil between the inside and the outside of the bulb (unit: °C., an average value of five samples). Taking the thermal stress formed in the heat treatment step for the production of a cathode ray tube into consideration, this strength is usually desired to be at least 45° C.

Dielectric breakdown

Electrodes of 20 mm×20 mm were provided on the inside and the outside of the sealed portion of a sample specimen of the bulb panel and funnel and dielectric breakdown was measured by applying a direct current voltage of 50 kV for one minute.

Tertiary crystal level

The cross section of the frit-sealed portion was polished to a mirror surface, and precipitation of tertiary crystals (PbO) was observed by a reflection electron image of an electron microscope. The one wherein no tertiary crystal is observed or tertiary crystals are so little that they are not influential over the dielectric breakdown (no more than two tertiary crystals having a diameter of at least 5 μm, are observed on average in an area of 100 μm×100 μm, as observed with a magnification of 1,000 times), was designated as A, and the one wherein tertiary crystals are present beyond such a level, was designated as B.

It is evident from Table 1, the hermetic sealing composition of the present invention has at least conventional levels of various properties and is excellent in the reliability without dielectric breakdown even when a high voltage (of a level of 50 kV) is applied.

TABLE 1

| Example No. | 1 | 2 | 3 | 4 | 5 | 6 | 7 | 8 |
| --- | --- | --- | --- | --- | --- | --- | --- | --- |
| Glass composition (wt %) | | | | | | | | |
| PbO | 78.0 | 76.0 | 74.0 | 81.5 | 75.1 | 74.9 | 75.0 | 76.0 |
| $B_2O_3$ | 8.0 | 9.8 | 8.8 | 7.6 | 8.5 | 8.6 | 8.6 | 8.0 |
| ZnO | 11.4 | 11.2 | 13.5 | 9.2 | 12.4 | 12.5 | 12.5 | 11.9 |
| $SiO_2$ | 2.0 | 1.5 | 1.2 | 1.5 | 2.0 | 2.1 | 1.9 | 2.0 |
| BaO | 0.6 | 1.5 | 2.5 | 0.2 | 2.0 | 1.9 | 2.0 | 2.1 |
| Sealing composition | | | | | | | | |
| Additives (parts by weight) | | | | | | | | |
| $\alpha$-$4PbO.B_2O_3$ powder | 0.02 | 0.002 | 0.006 | 0.08 | 0 | 0 | 0 | 0 |
| $Pb_3O_4$ powder | 0 | 0.009 | 0 | 0 | 0.05 | 0.03 | 0 | 0 |
| Basic composition (wt %) | | | | | | | | |
| Glass | 93.5 | 94 | 91 | 89 | 99.1 | 99.2 | 99.1 | 97.5 |
| Filler | | | | | | | | |
| Zircon | 1.5 | 0 | 1.0 | 0 | 0.9 | 0.8 | 0.9 | 0 |
| Cordierite | 5.0 | 0 | 0 | 8 | 0 | 0 | 0 | 2.0 |
| Alumina | 0 | 1.0 | 0 | 0 | 0 | 0 | 0 | 0.5 |
| Mullite | 0 | 5.0 | 0 | 0 | 0 | 0 | 0 | 0 |
| Lead titanate | 0 | 0 | 8.0 | 0 | 0 | 0 | 0 | 0 |
| Silica | 0 | 0 | 0 | 0.5 | 0 | 0 | 0 | 0 |
| $\beta$-Eucryptite | 0 | 0 | 0 | 1.5 | 0 | 0 | 0 | 0 |
| $\beta$-Spodumene | 0 | 0 | 0 | 0.5 | 0 | 0 | 0 | 0 |
| $\beta$-Quartz solid solution | 0 | 0 | 0 | 0.5 | 0 | 0 | 0 | 0 |
| Firing temp. (°C.) | 440 | 440 | 450 | 420 | 440 | 440 | 440 | 440 |
| Flow button diameter (mm) | 27.2 | 26.8 | 27.0 | 27.1 | 27.5 | 27.6 | 27.5 | 27.3 |
| Bonding residual strain (m$\mu$/cm) | +85 | +120 | +230 | +35 | +20 | +5 | +15 | +23 |
| Thermal expansion coefficient ($\times 10^{-7}$/°C.) | 90 | 88 | 86 | 93 | 98 | 97 | 98 | 96 |
| Dielectric breakdown | Nil | Nil | Nil | Nil | Nil | Nil | Yes | Yes |
| Tertiary crystal level | A | A | A | A | A | A | B | B |
| Strength against hydraulic pressure (kg/cm$^2$) | 4.1 | 4.0 | 4.5 | 3.6 | 4.1 | 4.3 | 4.0 | 3.8 |
| Strength against heat (°C.) | 50 | 48 | >60 | 52 | >60 | 55 | 52 | 48 |

When the composition of the present invention is used for hermetic sealing of the panel and the funnel of a cathode ray tube, the frit-sealed portion is free from dielectric breakdown even when a high voltage is applied across the inside and outside of the sealed portion. Thus, the composition of the present invention is excellent in the reliability.

We claim:

1. A hermetic sealing composition comprising 100 parts by weight of a basic composition consisting of from 80 to 99.9 wt % of a crystalline low melting glass powder containing lead and boron and from 0.1 to 20 wt % of a low expansion ceramic filler, and from 0.001 to 1.0 part by weight, in total, of an $\alpha$-$4PbO.B_2O_3$ crystal powder and a $Pb_3O_4$ powder, incorporated to the basic composition, the thermal expansion coefficient of the sealing composition after firing being from $80 \times 10^{-7}$ to $105 \times 10^{-7}$/°C. within a range of from room temperature to 300° C.

2. The hermetic sealing composition according to claim 1, wherein PbO crystals do not substantially precipitate when the sealing composition is fired within a temperature range of from 410° to 450° C. for from 15 to 60 minutes.

3. The hermetic sealing composition according to claim 1, wherein the number of PbO crystals which precipitate when the sealing composition is fired within a temperature range of from 410° to 450° C. for from 15 to 60 minutes and which have a diameter of at least 5 μm, is not more than two on average within a region of 100 μm×100 μm.

4. The hermetic sealing composition according to claim 1, wherein from 0.001 to 0.9 part by weight, in total, the $\alpha$-$4PbO.B_2O_3$ crystal powder and the $Pb_3O_4$ powder, is incorporated to 100 parts by weight of the basic composition.

5. The hermetic sealing composition according to claim 1, wherein the crystalline low melting glass powder has a composition consisting essentially of from 73 to 82 wt % of PbO, from 7 to 10 wt % of $B_2O_3$, from 9 to 14 wt % of ZnO, from 1 to 3 wt % of $SiO_2$, and from 0.1 to 3 wt % of BaO.

6. The hermetic sealing composition according to claim 1, wherein the low expansion ceramic filler is at least one member selected from the group consisting of zircon, alumina, mullite, silica, lead titanate, cordierite, $\beta$-eucryptite, $\beta$-spodumene and $\beta$-quartz solid solution.

7. The hermetic sealing composition according to claim 1, comprising 0.001 to 0.09 part by weight, in total, of said $\alpha$-$4PbO.B_2O_3$ crystal powder and said $Pb_3O_4$ powder.

8. The hermetic sealing composition according to claim 1, comprising 0.005 to 0.07 part by weight, in total, of said $\alpha$-$4PbO.B_2O_3$ crystal powder and said $Pb_3O_4$ powder.

9. The hermetic sealing composition according to claim 1, comprising 0.001 to 1 part by weight of said $\alpha$-$4PbO.B_2O_3$ crystal powder.

10. The hermetic sealing composition according to claim 9, comprising 0.001 to 0.09 part by weight of said $\alpha$-$4PbO.B_2O_3$ crystal powder.

11. The hermetic sealing composition according to claim 9, comprising 0.005 to 0.07 part by weight of said $\alpha$-$4PbO.B_2O_3$ crystal powder.

* * * * *